United States Patent [19]

Kimura et al.

[11] Patent Number: 4,656,951
[45] Date of Patent: Apr. 14, 1987

[54] ROTARY TABLE UNIT

[75] Inventors: Sosaku Kimura, Tokyo; Toshikazu Hatsuse; Masami Shimizu, both of Tanashi; Masakazu Miyashita, Kokubunji; Junichi Yoshioka, Chiba; Akira Kanai, Higashiyamato; Koichi Koizumi, Matsudo, all of Japan

[73] Assignee: Citizen Watch Co., Ltd., Tokyo, Japan

[21] Appl. No.: 737,267

[22] Filed: May 23, 1985

[30] Foreign Application Priority Data

May 25, 1984 [JP] Japan .............................. 59-105708
Aug. 18, 1984 [JP] Japan .............................. 59-172264

[51] Int. Cl.$^4$ ............................................. A47B 45/00
[52] U.S. Cl. ................................................. 108/20
[58] Field of Search ................... 108/20, 139; 104/35, 104/36; 269/57, 58, 59

[56] References Cited

U.S. PATENT DOCUMENTS

| 905,018 | 11/1908 | Sullivan et al. | 108/20 |
| 2,561,346 | 7/1951 | Vlieg et al. | 108/20 X |
| 3,142,269 | 7/1964 | Keck | 108/20 |
| 3,397,656 | 8/1968 | Abarotin | 108/20 |
| 3,424,319 | 1/1969 | Hohlfelder, Jr. | 269/57 X |
| 4,114,541 | 9/1978 | Weddendorf | 108/20 |
| 4,213,401 | 7/1980 | Maag | 108/20 |

FOREIGN PATENT DOCUMENTS 688530 3/1965 Italy ........................................ 108/20

OTHER PUBLICATIONS

Machinist, Feb. 21, 1980, p. 37, "Friction Drive Takes Tiny Steps".
1983 SME Manufacturing Engineering Transactions, pp. 18 through 28.

Primary Examiner—Peter A. Aschenbrenner
Attorney, Agent, or Firm—Finnegan, Henderson, Farabow, Garrett & Dunner

[57] ABSTRACT

A rotary table unit having a stationary base element and a table element rotatably mounted on the stationary base element is provided with hydrostatic and hydrodynamic bearing guides forming a composite bearing guide mechanism for enabling smooth and stable rotation of the table element under application of local load to the table element. The rotary table unit is also provided with a main drive motor for rotating the table element and an auxiliary drive motor for supplementing a drive force of the main drive motor in response to a change in load applied to the table element.

9 Claims, 4 Drawing Figures

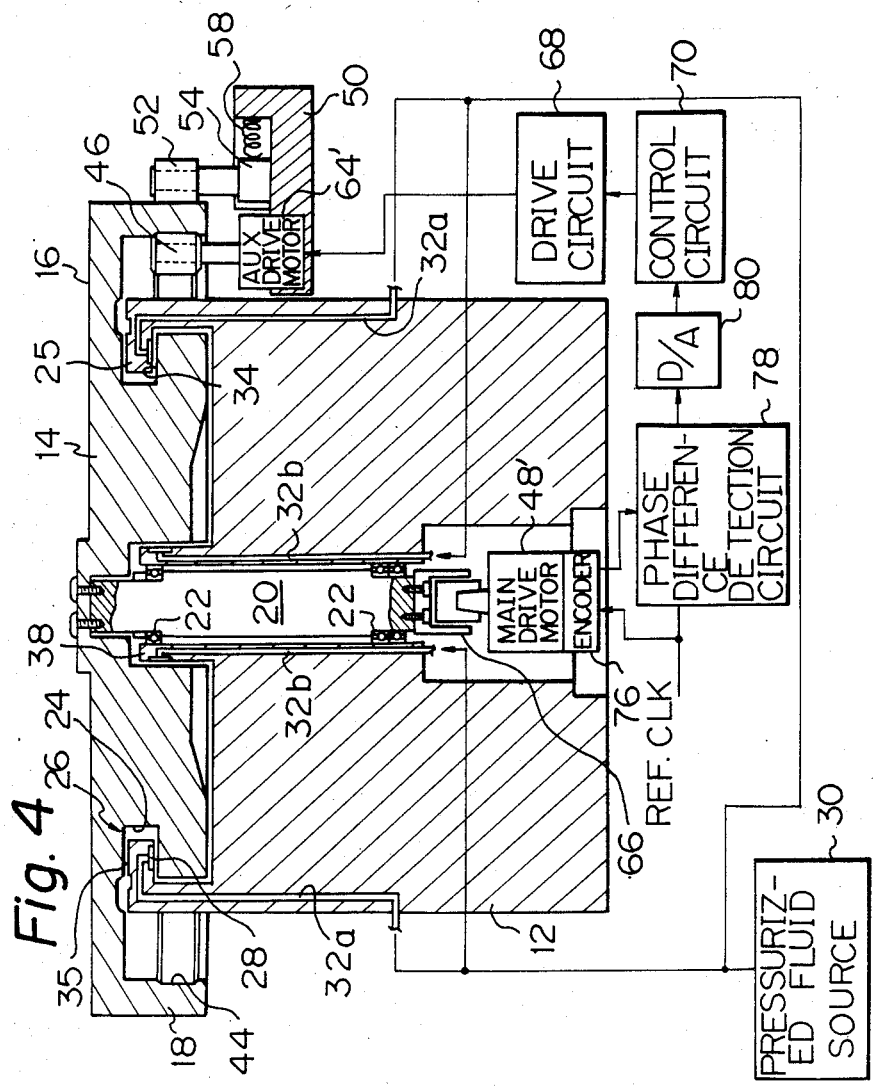

ROTARY TABLE UNIT

BACKGROUND OF THE INVENTION

1. Field of the Invention

The present invention relates to a rotary table unit adapted to be used as a rotatable work table of machine tools, measuring machines, and so on. More particularly, the present invention relates to an accurate rotary table unit adapted for use in the field of ultra precision machining of workpieces, such as microminiature components.

2. Description of the Related Art

Generally, a rotary table unit is constructed so that a table element rotatably mounted on a base element via guide means is driven by a drive source, such as an electric motor. In conventional high precision rotary table units, the table element is slidably supported on a guide portion of the base element, and lubricant oil is filled between the guide portion of the base element and the table element. The table element is rotated by a single drive motor which is connected to the shaft of the table element.

However, with such a sliding guide, if a local load, such as a grinding load, is applied to the table element in a direction perpendicular to the rotating direction of the table element, the table element is shifted due to the change in the gap in which the lubricant oil is filled. As a result, the workpiece on the rotary shifts relative to a machining element, such as a cutting tool. Accordingly, dimensional error of the workpiece occurs.

Such a local load also causes stick-slip motion of the table element on the slide guide means, which results in uneven rotation of the table element and reduced accuracy. In addition, the use of only a single drive motor is apt to result in irregular rotation of the table element or a slow down in the rotating speed of the table element when a local load is applied. Again, this results in dimensional error of the workpiece.

The above-described problems of conventional rotary table units mean lower reliability in use in the field of ultra precision machining where a high accuracy of machining on an order of 0.1 micrometer is needed, and aggravate the problems to be solved for such machining. For example, when a conventional rotary table unit is used for precision machining of a silicon wafer to obtain a mirror finish, the machined surface of the silicon wafer often suffers from an uneven finish or a striped pattern.

SUMMARY OF THE INVENTION

An object of the present invention is, therefore, to provide a rotary table unit capable of maintaining an even and stable rotating speed as well as rigid support of a table element on guide means against any load acting on the table element.

Another object of the present invention is to provide a highly accurate rotary table unit adapted for incorporation in a precision machine tool and capable of eliminating defects encountered by the conventional rotary table unit.

In accordance with the present invention, there is provided a rotary table unit which comprises a stationary base element, a table element rotatably mounted on the stationary base element and having a table face, a central shaft, and a peripheral rim, guide means for rotatably supporting the table element on the stationary base element, a main drive unit for rotating the table element, an auxiliary drive unit for assisting the main drive unit to drive the table element, a detection circuit for detecting load acting on the table element, and a control circuit for controlling operation of the auxiliary drive unit in accordance with detection of load by the detection circuit.

BRIEF DESCRIPTION OF THE DRAWINGS

FIG. 4 is a vertical cross sectional view of a rotary table unit and its related circuit arrangement, according to a second embodiment of the present invention.

DESCRIPTION OF THE PREFERRED EMBODIMENTS

Figure 1:
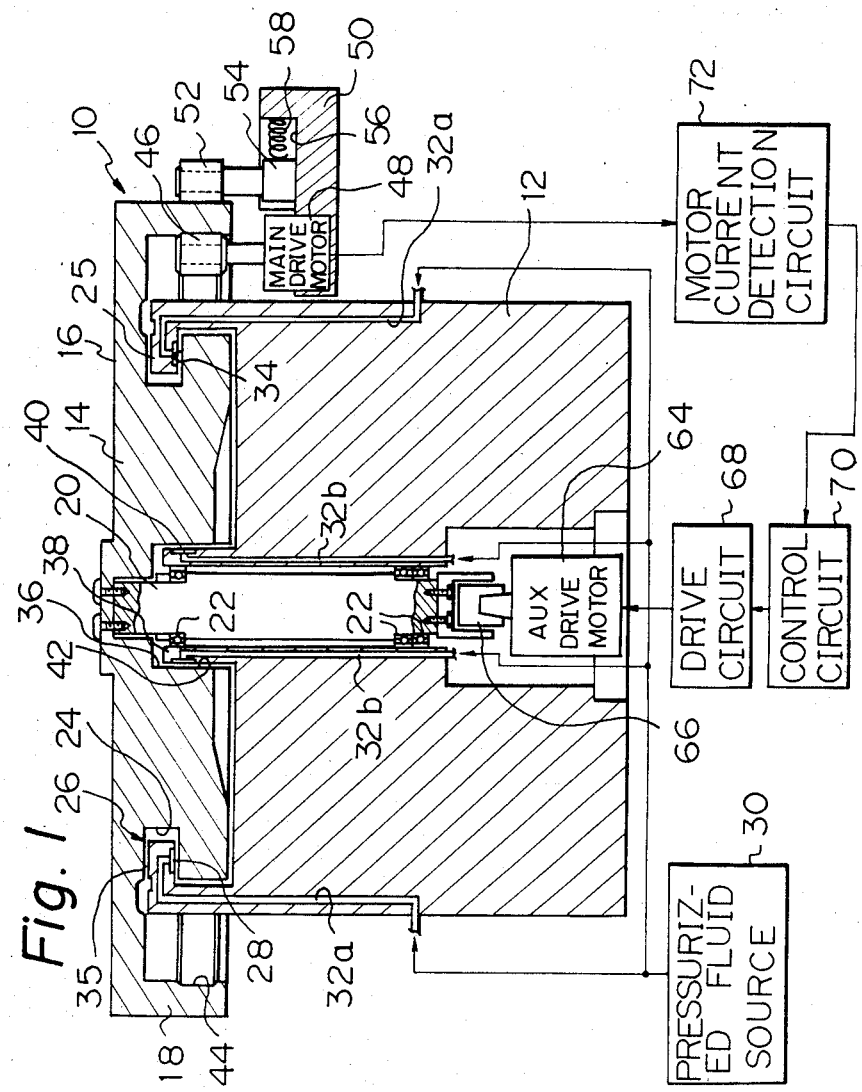
FIG. 1 is a vertical cross-sectional view of a rotary table unit and its related circuit arrangement according to a first embodiment of the present invention.
Figure 2:
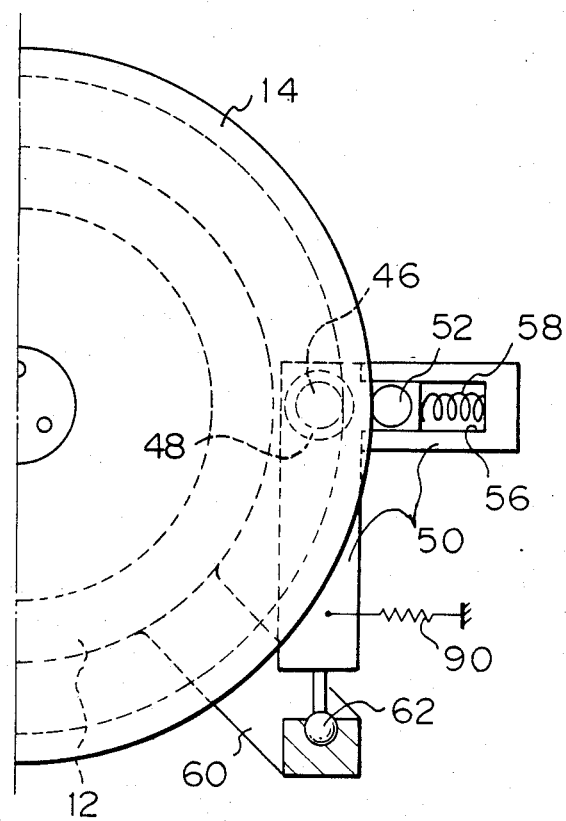
FIG. 2 is a partial plane view of the rotary table unit of FIG. 1.
Figure 3:
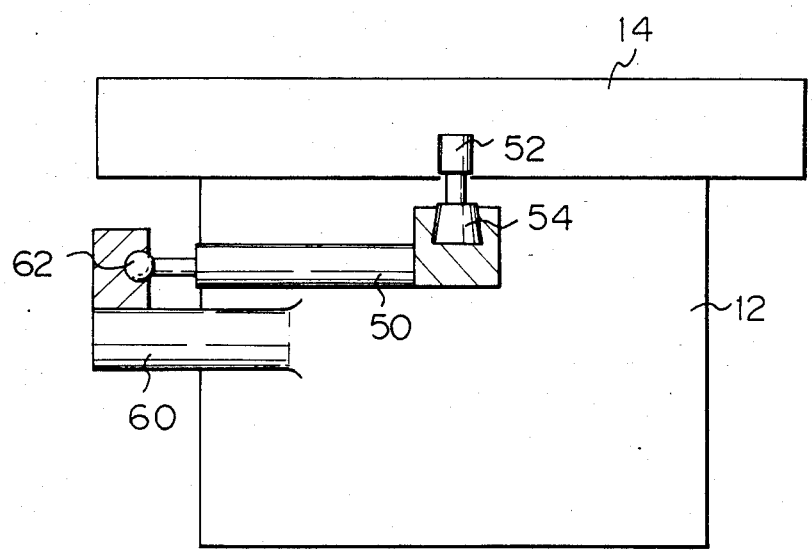
FIG. 3 is a side view, in part cross-section, of the rotary table unit of FIG. 1.

Referring to FIGS. 1 through 3, a rotary table unit 10 includes a stationary base element 12 having a cylindrical body, a table element 14 having a table face 16, and a peripheral rim 18. The unit 10 also includes a shaft 20 fixedly connected to the center of the table element 14 by means of screw bolts. The shaft 20 may be constructed so as to be integral with the table element 14, as required. The table element 14 and the central shaft 20 are rotatably mounted on the base element 12 by means of suitable bearings 22. The table element 14 is formed with an annular groove 24 at a peripheral portion of the table element 14 inside the peripheral rim 18. The annular groove 24 is radially recessed so that a guide portion 25 formed on an upper part of the base element 12 is complementarily fit in the annular groove 24. The guide portion 25 of the base element 12 is formed, at its lower face, with circumferentially spaced apart hydrostatic bearing guide means comprising static pressure pads 28 where a pressurized fluid, such as pressure oil or pressurized air, is supplied from a pressurized source 30, via fluid passageways 32a formed in the base element 12. The pressurized fluid supplied to the static pressure pads 28 also fills a circular clearance 34 provided between the lower face of the guide portion 25 and the lower inner wall of the annular groove 24. Thus, the circular clearance 34 filled with the pressurized fluid is able to function as a hydrostatic bearing guide for supporting the table element 14 on the base element 12.

Another circular clearance 35 is formed between the upper face of the guide portion 25 of the base element 12 and the upper inner wall of the annular groove 24 of the table element 12 and acts as a hydrodynamic bearing guide means. That is, a combination of hydrostatic and hydrodynamic bearing guides is arranged at a peripheral portion of the table element 14 inside the peripheral rim 18, so that a composite bearing guide mechanism 26 is provided for enabling smooth rotational movement of the table element 14 with respect to the base element 12. The above-mentioned hydrodynamic bearing guide of the composite bearing guide mechanism 26 in the form of a sliding bearing guide may be replaced with a rolling bearing guide, if preferable. In the composite bearing guide mechanism 26, the upper face of the guide portion 25 functions as a reference face on which the table element 14 slides in the rotating direction under a predetermined contact pressure regulated by the pressurized fluid in the static pressure pads 28.

A similar hydrostatic bearing guide means is also provided in the central portion of the table element 14. That is, the table element 14 is formed, at the central portion, with a vertical recess 36 in which a cylindrical guide 38 of the base element 12 vertically projects and is complementarily fit. The cylindrical guide 38 is formed with circumferentially spaced apart static pressure pads 40 supplied via fluid passageways 32b with pressurized fluid which fills an annular clearance 42 provided between the inner wall of the vertical recess 36 and the cylindrical guide 38. The annular clearance 42 filled with the pressurized fluid functions as a hydrostatic bearing guide for radially supporting the table element 14.

The peripheral rim 18 of the table element 14 is formed, at its inside wall, with an annular groove 44 in which a drive means such as a drive roll 46 is frictionally engaged by the help of a spring 90. The drive roll 46 is rotated by a main drive motor 48 comprised of an electric motor, which is fixedly mounted on a support arm 50. The support arm 50 also mounts thereon a pinch roll 52 which frictionally contacts a portion of the outer circumference of the peripheral rim 18 of the table element 14. The pinch roll 52 is provided with a foot 54 slidably fit in a radial groove 56 of the support arm 50 and is pressed inward by a spring 58 so that the pinch roll 52 is pressed against the peripheral rim 18 of the table element 14. The pinch roll 52, thus cooperates with the drive roll 46 so as to ensure that a drive force exerted by the main drive motor 48 is transmitted to the peripheral rim 18 of the table element 14 without any loss. Therefore, it is ascertained that the table element 14 stably rotates without causing any stick-slip motion even under the condition of high load and low rotational speed.

Further, as shown in FIGS. 2 and 3, the support arm 50 is connected to a radial projection 60 of the base element 12 by means of a ball-and-socket joint 62. Therefore, the support arm 50 is allowed to freely swing in all directions except for the tangential direction of the peripheral rim 18. This means that the drive force of the main drive motor 48 can be transmitted from the drive roll 46 to the peripheral rim 18 of the table element 14 only in the tangential direction of the peripheral rim 18. That is, no appreciable radial component appears in the transmission of the drive force from the drive roll 46 to the table element 14. Accordingly, the table element 12 can smoothly rotate under the guidance of the afore-mentioned composite bearing guide mechanism 26.

Referring again to FIG. 1, an auxiliary drive means such as a drive motor 64 is connected to the shaft 20 via a coupling device 66. The auxiliary drive motor 64, comprised of, for example, an electric motor, is provided for supplementing the drive force of the main drive motor 48. The auxiliary drive motor 64 is operated, via a drive circuit 68, by a control circuit means 70 which is in turn electrically connected to a detection circuit means for detecting a load acting on the table. As embodied, this means comprises motor current detection circuit 72. The motor current detection circuit 72 detects a change in the electric current of the main drive motor 48, thereby detecting a change in any load applied to or acting on the table element 14. The motor current detection circuit 72 sends a detection signal to the control circuit 70. Thus, the control circuit 70 controls the drive circuit 68 in accordance with the detection signal from the motor current detection circuit 72 and thus controls the operation of the auxiliary drive motor 64.

The operation of the rotary table unit 10 of FIGS. 1 through 3 will now be described hereinbelow.

In operation, a workpiece (not shown) is mounted on the table face 16 of the table element 14 and is subjected to, for example, a machining operation by the machine tool, such as a grinding machine. When the workpiece is relatively heavy or when a machining load is applied to the table element 14 during the machining operation, the heavy weight of the workpiece or the load applied is detected by the motor current detection circuit 72 through the detection of the change in the electric current supplied to the main drive motor 48. The detection result is sent to the control circuit 70. Thus, the control circuit 70 operates the auxiliary drive motor 64 via the drive circuit 68. The auxiliary drive motor 64 in turn drives the table element 14 so as to supplement the drive force of the main drive motor 48. Thus, the table element 14 can maintain a constant rotational speed even with the load applied to the table element 14.

Further, while the table element 14 is rotating, since the hydrodynamic bearing guide of the composite bearing guide mechanism 26 has a high rigidity in the rotational direction and since the hydrostatic bearing guide of the composite bearing guide mechanism 26 has a high rigidity in the direction perpendicular to the rotational direction, the table element 14 is smoothly guided by the composite bearing guide mechanism 26 even if a local load, such as a machining load, is applied to the element 14 via the workpiece. Accordingly, accurate rotation as well as accurate positioning of the table element 14 is obtained with certainty.

In the described embodiment of FIGS. 1 through 3, the main drive motor 48 may also be a hydraulic or electrohydraulic motor. When a hydraulic motor is employed as the main drive motor 48, the motor current detection circuit 72 is replaced with a hydraulic pressure detection circuit to detect the change in hydraulic pressure supplied to the hydraulic motor in response to a change in the load applied to the table element 14.

FIG. 4 illustrates a second embodiment of the present invention. In FIG. 4, the same reference numerals as those appearing in FIG. 1 designate the same or similar elements or circuits as the first embodiment.

For brevity's sake, only the differences in construction of the second embodiment will be described. In FIG. 4, a main drive motor 48' is connected to the central shaft 20 of the table element 14 by means of a coupling device 66, which can operate so as to absorb any vibration of the main drive motor 48'. Thus, transmission of vibration of the motor 48' to the central shaft 20 can be prevented by the coupling device 66. The main drive motor 48' is provided with a rotary encoder 76 through which the rotation of the main drive motor 48' can be detected. The rotary encoder 76 may be a conventional rotary pulse encoder emitting electric pulses, the number of which is proportional to the rotation of the main drive motor 48'. Reference clock pulses are supplied to the rotary encoder as reference pulses. The electric pulses emitted from the rotary encoder 76 are supplied to a phase difference detection circuit 78 to which the reference clock pulses are also supplied. Thus, the phase difference detection circuit 78 detects the phase difference between the reference clock pulses and the pulses supplied from the rotary encoder 76 and eventually detects a change in the rotation of the main drive motor 48'.

The detected result of the phase difference detection circuit 78 is supplied, via a digital-to-analog converter 80, to the control circuit 70, which controls the drive circuit 68. The drive circuit 68 in turn controls the operation of an auxiliary drive motor 64' that is arranged so as to rotate the drive roll 46. That is, in the second embodiment, the main drive motor 48' is connected with the central shaft 20 of the table element 14, while the auxiliary drive motor 64' for supplementing the drive force of the main drive motor 48' is connected with the peripheral rim 18 of the table element 14. The pinch roll 52 operates in the same manner as the first embodiment while the auxiliary drive motor 64' is in operation.

It should be understood that the composite bearing guide mechanism 26 arranged in the peripheral portion of the table element 14 is able to guarantee smooth and stable roation of the table element 14 in the same manner as the first embodiment even if a local load, for example, a machining load, is applied to the table element 14 via a workpiece that is secured to the table face 16. As a result, it is possible to obtain highly accurate rotation as well as high positioning accuracy of the table element 14. Therefore, the operational reliability of the rotary table unit 10 can be very high.

The main and auxiliary drive motors may be conventional electric, hydraulic, or electrohydraulic motors, as required.

From the foregoing description of the preferred embodiments of the present invention, it will be understood that the rotary table unit of the present invention can be used as a rotary type work table in the field of ultra precision machining of a workpiece, such as microminiature components, under high operational reliability. It should also be understood that various changes or modification are possible to those skilled in the art without departing from the scope and spirit of the present invention.

We claim:

1. A rotary table comprising
   a cylindrical stationary base having a central bore, an upwardly projecting central guide surrounding said central bore, and an upwardly projecting annular guide surrounding an upper peripheral portion of the base;
   a circular table having a face on an upper surface thereof for mounting a workpiece, a central shaft rotatably mounted in the central bore of the base, a peripheral rim extending the peripheral portion of the table, a first annular groove in the peripheral portion of the table, said annular guide on the base cooperating with and projecting into said first annular groove, a second annular groove in the peripheral rim of the table, and a central recess in the table that cooperates with the central guide on the base;
   hydrostatic bearing guide means located between a part of said annular guide of said stationary base and a part of said first annular groove of said table, and also between said upwardly projecting central guide and said central recess of said table, said hydrostatic guide means rotatably supporting said table on said stationary base;
   hydrodynamic bearing guide means located between another part of said annular guide of said stationary base and another part of said first annular groove of said table that vertically faces said another part of said annular guide, said hydrodynamic bearing guide means slidably supporting said table on said annular guide of said stationary base during rotation of said table whereby the table slides in the rotating direction under a predetermined contact pressure regulated by the hydrostatic bearing guide means;
   main drive means located for engagement with one of said second annular groove or said central shaft of said table for rotating said table;
   auxiliary drive means for supplementing said main drive means to supply said table with a supplementary drive force to rotate said table, said auxiliary drive means being located for engagement with the other of said second annular groove or said central shaft of said table;
   detection circuit means for detecting a load acting on said table; and
   control circuit means for controlling operation of said auxiliary drive means in accordance with the detection of said load by said detection circuit means to maintain a constant rotational speed of the table.

2. The rotary table of claim 1, wherein said main drive means comprises a rotary drive roll frictionally in contact with said second annular groove in the peripheral rim of said table and an electric drive motor for rotating said drive roll and wherein said detection circuit means comprises a motor current detection circuit for detecting a change in the electric drive current of said electric drive motor.

3. The rotary table of claim 2, wherein said main drive means further comprises a rotary pinch roll frictionally in contact with a surface of said peripheral rim of said table opposite from the surface of said rim containing the second annular groove and cooperating with said drive roll to rotate said table.

4. The rotary table of claim 3, including a support arm on which is mounted said electric motor and drive roll and said pinch roll so that said pinch roll is resiliently biased against said peripheral rim, said support arm being movably mounted on a projection projecting radially outward from said stationary base by a ball-and-socket joint.

5. The rotary table of claim 4, wherein said auxiliary drive means comprises an auxiliary drive motor coupled with said central shaft of said table to rotate said shaft and the table.

6. The rotary table of claim 1, wherein said main drive means comprise a first electric motor coupled with said central shaft of said table to rotate said shaft and the table and said detection circuit means comprises a rotary encoder directly connected to said first electric motor for detecting a change in rotation of said first electric motor and an electric rotation detecting circuit connected to said rotary encoder for receiving a detection signal from said rotary encoder and for controlling operation of the auxiliary drive means in response to the detection signal received from said rotary encoder.

7. The rotary table of claim 6, wherein said auxiliary drive means comprises a rotary drive roll frictionally in contact with said second annular groove in the peripheral rim of said table and a second electric motor coupled with said drive roll for rotating said drive roll, and a rotary pinch roll frictionally in contact with a surface of said peripheral rim of said table opposite from the surface of the rim containing the second annular groove and cooperating with the drive roll to rotate said table.

8. The rotary table of claim 7, including a support arm on which is mounted said second electric motor and drive roll and said pinch roll so that said pinch roll is resiliently biased against said peripheral rim, said support arm being movably mounted on a projection projecting radially outward from said stationary base element by a ball-and-socket joint.

9. The rotary table of claim 1, wherein the hydrostatic bearing guide means comprises static pressure pads in the annular and central guides opening into and supplying pressurized fluid to said first annular groove and central recess respectively.

* * * * *